United States Patent Office 2,896,644
Patented July 28, 1959

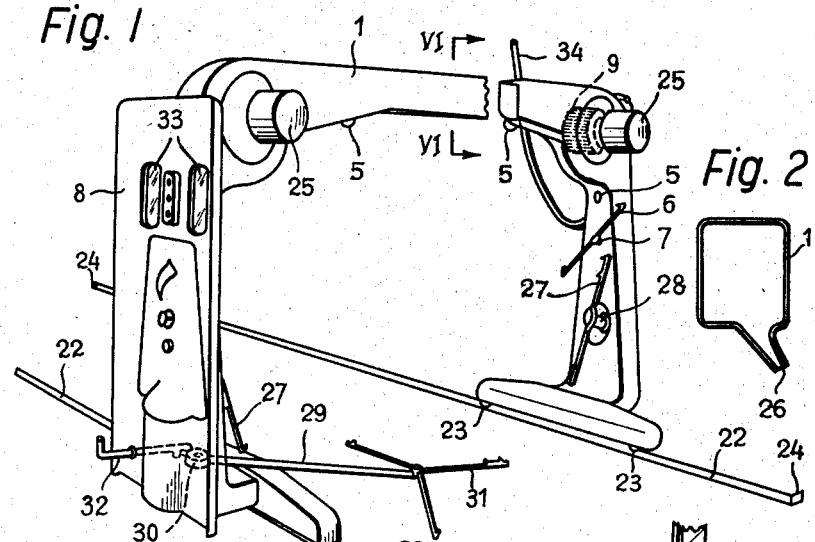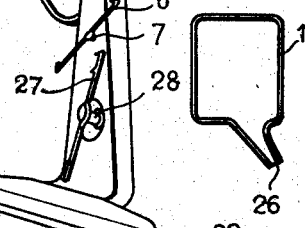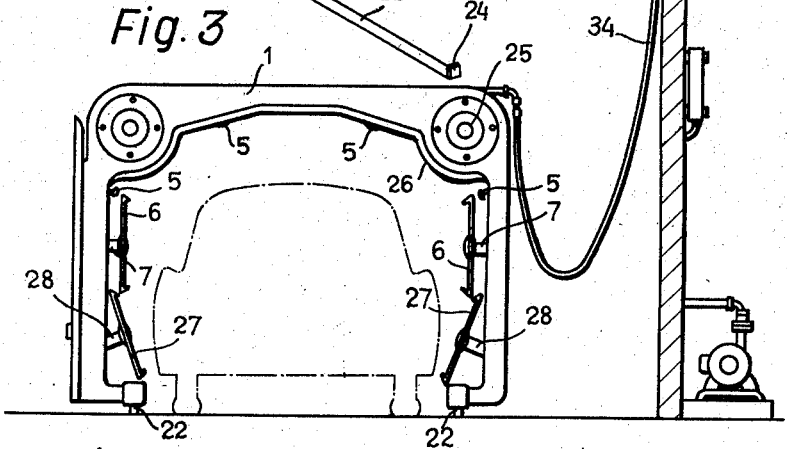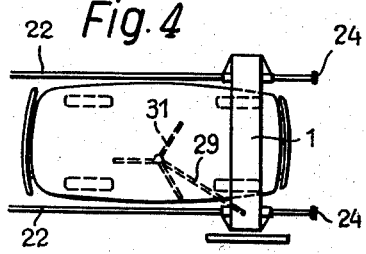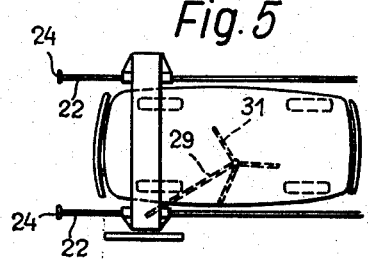

2,896,644
MOTOR VEHICLE WASHING PLANT

Roberto Emanuel, Turin, Italy, assignor to Emanuel di Giuseppe e Roberto Emanuel & C. S.A.S., Turin, Italy Application October 2, 1957, Serial No. 687,734

1 Claim. (Cl. 134—99)

This invention relates to a motor vehicle washing plant.

It is the object of this invention to provide inexpensive washing plants of reduced size capable of effectively washing motor vehicles with reduced water consumption and work.

The improved vehicle washing plant comprises a movable structure provided with washing jets fed with pressure liquid and at least one blower for quick drying of the vehicle.

Further characteristic features of this invention will be understood from the following detailed description referring to the accompanying drawings which show by way of example some embodiments thereof.

Figure 1 is a perspective view of a washing plant, the movable structure of which is capable of rolling on guides secured to the floor, Figure 2 is a sectional view on line VI—VI of Figure 1, Figure 3 is a front view of the plant shown in Figure 1, Figures 4 and 5 are diagrammatical plan views of the apparatus shown in Figures 1 to 3 in two operating positions.

According to the embodiment shown in Figures 1 to 5 the movable structure 1, which is preferably made of sheet metal, is provided with lower rollers 23 rolling on rails 22 secured to the floor and provided with stroke end stops 24.

The movable structure is provided at the angles between the horizontal bridge portion and upright branches with two blowers 9 actuated by electric motors 25. The air blown by the blowers 9 is conveyed to the underlying vehicle through a slit 26 cut in the bridge portion of the gantry (see Figures 1 and 2).

Jets 27 rotating about oblique axes 28 are arranged in addition to the rotary jets 6 on the lower portion of the sides of the movable structure in order to wash the lower vehicle portion.

A horizontal arm 29 is arranged at the lower end of the vertical branches of the movable structure capable of oscillation about a vertical pivot 30 and carries at its end a rotary jet 31 adapted to deliver pressure water for washing the lower vehicle portion. The arm 29 is controlled by an operating lever 32 by means of which it is possible to move the arm 29 to a position substantially parallel with the guide rails 22, to let the vehicle through to its washing position and thereupon return the arm 29 beneath the vehicle for washing. Displacement of the movable structure 1 with respect to the stationary vehicle causes the arm 29 at the ends of the movements of the movable structure to abut the vehicle wheels and perform oscillations, thereby varying the position of the rotary jet 31 for the purpose of fully washing the lower vehicle portion.

According to a modification not shown on the drawing two rotary jets could be provided at the end of the arm 29 in order to improve washing of the lower vehicle portion.

Figure 1 shows the controls for actuating the various types of jets fitted externally of the protecting guard 8 in which two transparent windows 33 are moreover provided for inspection of the washing zone by the operator.

The required water, air and electric power are led to the movable structure through suitable cables and pipes all enclosed within a flexible sheath 34.

It will be understood that, the principle of the invention being left unvaried, constructional details and embodiments can be largely varied from the example described and illustrated without departing from the scope of this invention.

What I claim is:

In a vehicle washing apparatus, a substantially U-shaped hollow sheet metal frame in an inverted upright position adapted to span the body of the vehicle, the U-shaped frame comprising a pair of wheeled legs and a bracing section interconnecting the legs, blower housings formed by the sheet metal frame in transition zones between the bracing section and the legs, an air blower accomodated in each housing in the frame, a substantially downwardly directed slot-shaped blowing nozzle in the bracing section extending throughout the span of the frame, a rotary water jet supported from each leg to emanate water jets in a general direction towards the other leg, a tubular arm extending from a root section of one leg within the span of the frame, the said tubular arm being pivoted on the respective leg for swinging in a horizontal plane beneath the vehicle body, a rotary jet mounted rotatably in a horizontal plane on the free end of the tubular arm, and control means supported from the said one leg for controlling the blowers, rotary jets and swinging movements of the tubular arm.

References Cited in the file of this patent
UNITED STATES PATENTS

| 2,465,562 | Hopper | Mar. 29, 1949 |
| 2,788,009 | Lones | Apr. 9, 1957 |

FOREIGN PATENTS

| S. 32,233 | Germany | May 9, 1956 |